INVENTORS
RONALD A. COHEN &
ROY K. WHEELER

BY

ATTORNEYS

United States Patent Office 3,796,592
Patented Mar. 12, 1974

3,796,592
METHOD AND APPARATUS FOR STABLE SILICON DIOXIDE LAYERS ON SILICON GROWN IN SILICON NITRIDE AMBIENT
Ronald A. Cohen, South Acton, and Roy K. Wheeler, Littleton, Mass., assignors to the United States of America as represented by the Administrator of the National Aeronautics and Space Administration
Filed Sept. 9, 1969, Ser. No. 856,253
Int. Cl. B05b 13/06; C23c 11/00
U.S. Cl. 117—95        2 Claims

ABSTRACT OF THE DISCLOSURE

A method and apparatus for thermally growing stable silicon dioxide layers on silicon is disclosed. A previously etched and baked silicon nitride tube placed in a furnace is used to grow the silicon dioxide. First, pure oxygen is allowed to flow through the tube to initially coat the inside surface of the tube with a thin layer of silicon dioxide. After the tube is coated with the thin layer of silicon dioxide, the silicon is oxidized thermally in a normal fashion. If the tube becomes contaminated, the silicon dioxide is etched off thereby exposing clean silicon nitride and then the inside of the tube is recoated with silicon dioxide. As is disclosed, the silicon nitride tube can also be used as the ambient for the pyrolytic decomposition of silane and ammonia to form thin layers of clean silicon nitride.

ORIGIN OF THE INVENTION

The invention described herein was made by employees of the United States Government and may be manufactured and used by or for the Government for governmental purposes without the payment of any royalities thereon or therefor.

BACKGROUND OF THE INVENTION

This invention relates to the growing of silicon dioxide layers on silicon, and more specifically, to the growing of stable silicon dioxide layers on silicon in a silicon nitride ambient and also relates to the pyrolytic decomposition of silane and ammonia in a silicon nitride ambient to grow clean layers of silicon nitride.

Silicon dioxide layers and silicon nitride layers have widespread use as passivation and dielectric layers for semiconductor devices such as integrated circuits, insulated gate field effect transistors, etc.

Stable layers are needed because unstable layers may cause circuit failure or system malfunction due to the fact that unstable layers produce poor parameters such as high leakage current, low Beta and high threshold voltages. In addition, unstable layers result in a poor yield caused by high failure rate with subsequent increase in cost and most important to space applications poor reliability.

Prior art methods of thermally growing stable silicon dioxide on silicon generally require ultraclean conditions. One such prior art method involves the use of pure quartz tubes and pure alumina liners. This prior art method requires that ultraclean processing techniques be utilized because quartz is no barrier to mobile ions. At best it is difficult to obtain and maintain the degree of cleanliness necessary to obtain a stable oxide by this prior art method. Mobile ions may be present on the slice surface before the oxide is grown or mobile ions may be introduced from the ambient during oxidation.

SUMMARY OF THE INVENTION

This invention relates to a method and apparatus that permits the thermal growing of clean stable silicon dioxides without the cost of maintaining the ultraclean environment required by the prior art methods. In accordance with this invention, a silicon nitride tube is cleaned by etching in hydrofluoric acid, rinsed in distilled deionized water, baked dry in a furnace, and then the silicon nitride tube is placed in a furnace or other suitable heating device and the inside of the tube is coated with a layer of silicon dioxide by permitting pure oxygen to flow through the tube. Silicon dioxide is then thermally grown on a silicon slice housed inside the tube. If the silicon dioxide layer on the inside of the tube becomes contaminated, it is etched off and a clean layer is again formed on the inside of the tube.

The silicon nitride tube can also be used as an ambient for the pyrolytic decomposition of silane and ammonia to form thin layers of clean silicon nitride. This method of forming thin layers of clean $Si_3N_4$ avoids the problem of mobile ions that is encountered in the prior art method of epitaxial deposition of $Si_3N_4$ in quartz tubes, because tubes can contain and also transmit mobile ions.

It is therefore an object of this invention to provide a method for growing stable silicon dioxide layers on silicon.

It is another object of this invention to grow stable silicon dioxide layers on silicon.

It is a further object of this invention to provide the apparatus for the thermal growing of stable silicon dioxide layers on silicon.

A still further object of this invention is to provide a method for forming thin layers of silicon nitride.

And a still further object of this invention is to provide the apparatus for forming thin layers of silicon nitride.

BRIEF DESCRIPTION OF THE DRAWINGS

The above objects and others will become apparent from the following detailed description of the invention when read in conjunction with the annexed drawings in which.

DESCRIPTION OF THE INVENTION

Figure 1:
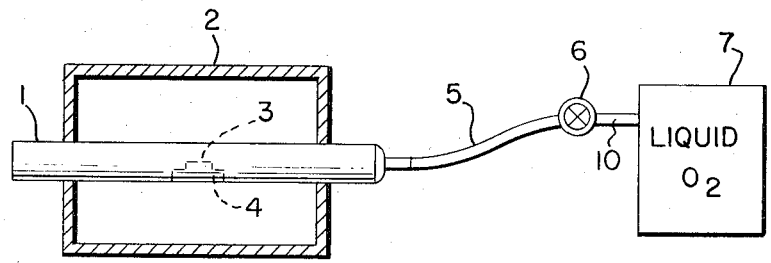
FIG. 1 is a pictorial view of the apparatus for growing stable silicon dioxide layers on silicon in accordance with the invention.

Referring now to FIG. 1, a silicon nitride tube 1 passing through a furnace or a heat chamber 2 is shown. The furnace 2 is shown in cross-section to more clearly show the silicon nitride tube 1. A flexible tube 5 is attached to one end of the tube 1. The tube 5 can be made of any suitable material such as Teflon. The other end of the tube 5 is connected to a needle valve 6 which may be an oxygen singlestage regulator valve such as is made by Airco. A tank of liquid oxygen (gas withdrawal) 7 is connected to the valve 6 by means of a second section of tubing 10. A wafer or a slice of silicon 3 is housed on a platform 4 inside the silicon nitride tube 1. The platform 4 can be made of any suitable material that will not contaminate the silicon slice 3 or the silicon nitride tube 1; for example, $Si_3N_4$ platform, SiC, or ultrapure quartz. Of course, the silicon slice 3 could be placed directly inside the tube 1 without any platform if the ambient temperature is on the order of 1000° C. Prior to the first usage, the silicon nitride tube is cleaned by etching with 24% hydrofluoric acid, rinsed in distilled, deionized water, and baked dry (at 1000° C.).

Silicon dioxide is thermally grown on the silicon wafer 3 in the following manner: The valve 6 is opened permitting pure gaseous oxygen from the tank 7 to flow through the silicon nitride tube 1 with the furnace 2 at a temperature of 1000° to 1200° C. Under these conditions a thin coating of silicon dioxide is formed on the inside of the silicon nitride tube 1. Silicon dioxide is then thermally grown on the silicon wafer 3 in a normal fashsion. The silicon wafer 3 having been placed inside the tube 1 prior to the initial step of forming a coating of silicon dioxide on the inside of the silicon nitride tube 1. The statement that silicon dioxide is grown on the cleaned silicon wafer 3 in a normal manner means that the silicon dioxide is grown on the silicon wafer 3 by any suitable well kown prior art method such as described in the review article entitled "The Si—$SiO_2$ Solid-Solid Interface System," A. G. Reveze and K.H. Zawinger, RCA Review pp. 22–76, March 1968.

Figure 2:
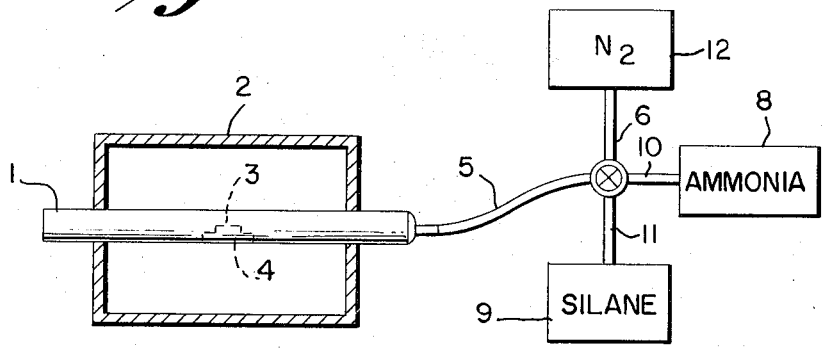
FIG. 2 is a pictorial view of the apparatus for forming thin layers of silicon nitride in accordance with the invention.

FIG. 2 shows the apparatus of the invention for forming thin layers of silicon nitride. The apparatus of FIG. 2 is identical to the apparatus of FIG. 1 except that the liquid oxygen tank 7 of FIG. 1 has been replaced by a first tank 8 containing ammonia and a second tank 9 containing silane has also been connected to the valve 6 by means of a section of tubing 11. Also, a nitrogen tank 12 has been added for flushing purpose and a hydrogen chloride and/or hydrogen tank can be added for optional in situ cleaning of the silicon wafer. In addition, the wafer or slice 3 can be made of any suitable materal including silicon, germanium, gallium arsenide, etc. Wafer 3 serves as a substrate upon which the silicon nitride is formed.

In the apparatus of FIG. 2, the inside of the silicon nitride tube 1 is initially coated with a thin layer of silicon dioxide. In order to form the silicon nitride layer, the valve 6 is turned on permitting the silane and ammonia to flow through the tube 1 with the furnace 2 at a temperature of 800° C. to 1200° C. A layer of silicon nitride is formed on the substrate 3 by the pyrolytic decomposition of the ammonia and silane.

Figure 3:
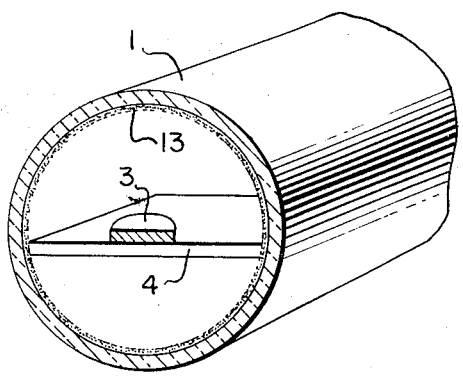
FIG. 3 is a pictorial view of the tube sectioned showing the silicon dioxide layer and the silicon slice.

The relative positions of the elements inside the silicon nitride tube 1 are clearly shown in FIG. 3. As shown, the inside of the silicon nitride tube 1 is coated with a layer of silicon dioxide 13. The platform or boat 4 is generally centrally located inside the tube 1 and the substrate 3 which is shown as being a silicon slice in this figure is seated on the boat 4.

While the invention has been described with reference to specific embodiments, it will be obvious to those skilled in the art that various changes and modifications can be made. For example, the silicon nitride container can be used as a noncontaminating environment for other chemical reactions, such as deposited alumina, $Al_2O_3$ and as a tube for sintering aluminum contacts to silicon integrated circuits.

What is claimed is:
1. A method for growing stable silicon dioxide layers on a silicon substrate comprising the steps of:
   placing said substrate in a silicon nitride tube;
   heating said tube to a temperature in the range of 1000° C. to 1200° C.;
   flowing pure oxygen through said tube when heated to said temperature range to thereby provide a coating of silicon dioxide on the inside surface of said silicon nitride tube; and
   thermally growing a layer of silicon dioxide on the silicon wafer inside said tube by thermal oxidation.
2. A method for growing thin films of silicon nitride on a substrate comprising the steps of:
   placing the substrate in a silicon nitride tube;
   heating said tube to a temperature in the range of 1000° C. to 1200° C.;
   flowing pure oxygen through said tube when in said temperature range to thereby provide a coating of silicon dioxide on the inside surface of said tube;
   flowing a mixture of silane and ammonia through said tube when maintained in a temperature range of 800° C. to 1200° C. to thereby form a layer of silicon nitride on said substrate by the pyrolytic decomposition of the ammonia and silane.

References Cited

UNITED STATES PATENTS 3,472,689    11/1970    Scott _____ 117—Nitride Dig.

FOREIGN PATENTS 1,190,308    10/1959    France _____ 117—Nitride

OTHER REFERENCES

Sage and Histed: Application of Silicon Nitride, Powder Metallurgy, 1961, No. 8, pp. 210–211.

B. E. Deal: "Electrochemical Society, Extended Abstract" Fall Meeting, Oct. 5–10, 1968 pp. 260–261.

Translation of French Pat. 1,190,308.

ALFRED L. LEAVITT, Primary Examiner

M. F. ESPOSITO, Assistant Examiner

U.S. Cl. X.R.

117–106 R, 106 A, 201, Digest 12